Dec. 27, 1938.   H. P. SELMAN   2,141,280
NUT TAPPING MACHINE
Filed Nov. 20, 1937
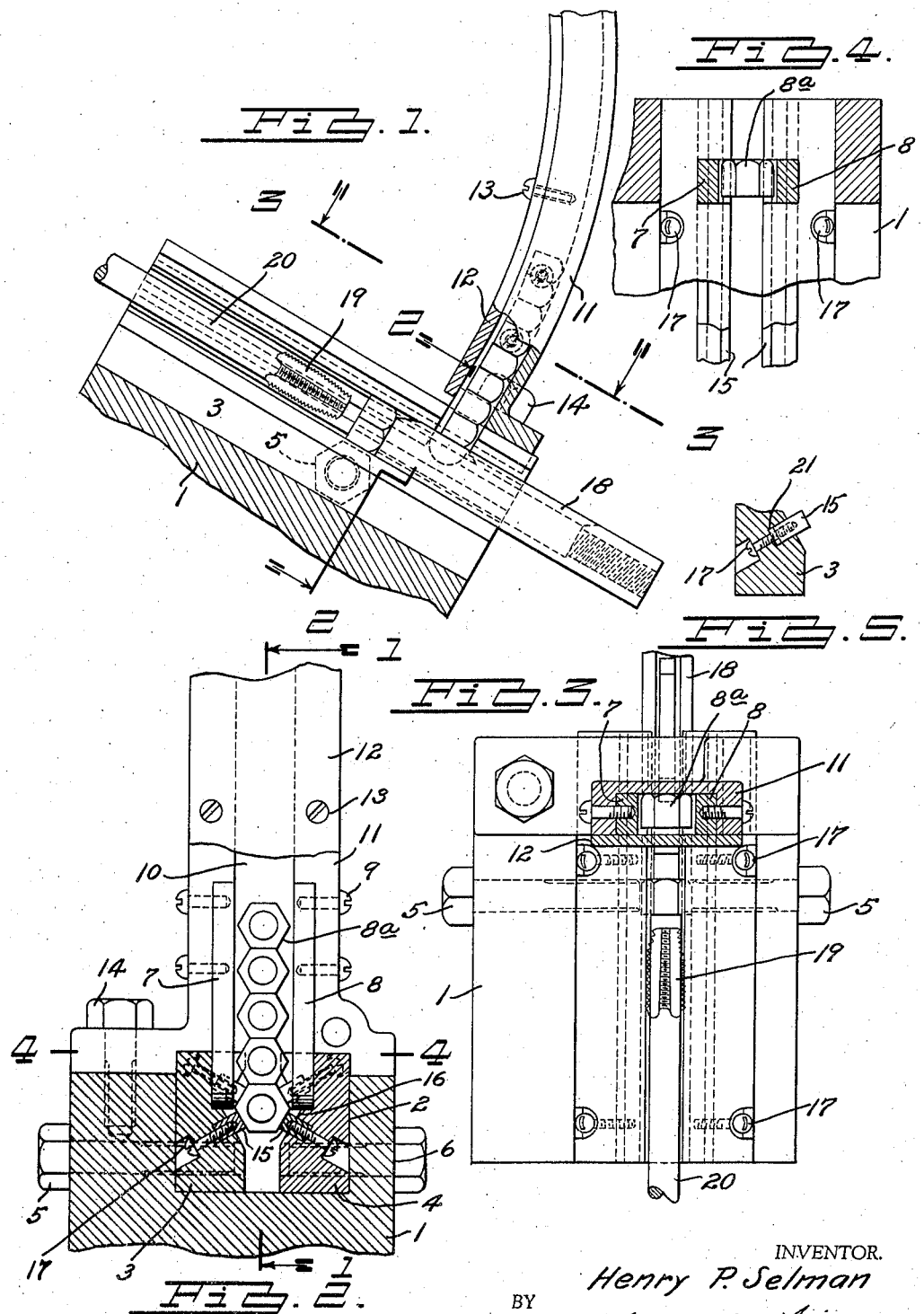
INVENTOR.
Henry P. Selman
BY
ATTORNEY.

Patented Dec. 27, 1938

2,141,280

UNITED STATES PATENT OFFICE 2,141,280

NUT TAPPING MACHINE

Henry P. Selman, Detroit, Mich.

Application November 20, 1937, Serial No. 175,545

4 Claims. (Cl. 10—129)

This invention relates to nut tapping machines, more particularly to the nut placing means and the nut holding jaws.

In prior machines, the nuts feed down a chute and at the bottom of the chute the nut drops into the jaws and oftentimes becomes tilted to occupy a plane at other than a right angle to the longitudinal center line of the jaws and also the jaws, through constant use, become worn permitting the nut to ride off center in respect to the rotatable tap which lies on the longitudinal center line of the way between the jaws for the nut.

A feature of this invention resides in the extension of the side walls of the chute into the jaws so that the nut, at the time of seating in the jaws, lies in a plane at a right angle to the longitudinal center line of the way for the nut and thus is centered in respect to the rotatable tap.

A feature of the invention further consists in the provision of adjustable and replaceable wear strips or bars arranged to engage the side faces of a hexagonal nut upon opposite sides thereof. By utilization of the wear strips or bars providing the surface on which the nut is moved onto the tap and thence from the jaws, the liability of displacement of the nut from its proper plane at a right angle to the axis of the tap or of its being positioned in the jaws off center in respect to the tap is thus obviated.

As the wear strips or bars supporting the nut are of much greater hardness, the nut face takes the wear rather than the strips and as the strips themselves may in time become worn, the bars may be adjusted as by means of a shim to proper position or when sufficiently worn may be utilized in jaws in a machine adapted for similar operations upon the next larger size of nuts.

These and other objects and various novel features of the invention are hereinafter more fully described and claimed, and the preferred form of construction of the jaws and nut feeding chute of a nut tapping machine embodying my invention is shown in the accompanying drawing in which—

Fig. 1 is a vertical section taken on line 1—1 of Fig. 2.

Fig. 2 is a section taken on line 2—2 of Fig. 1.

Fig. 3 is a sectional plan view taken on line 3—3 of Fig. 1.

Fig. 4 is a section taken on line 4—4 of Fig. 2.

Fig. 5 is a fragmentary sectional view taken transversely of a wear resistant bar.

No attempt has here been made to show the complete machine and this well known type of nut tapping machine wherein the nut is moved onto a rotating tap while supported by jaws. The jaws of the machines may lie at an angle to the horizontal or may occupy a horizontal plane.

In the drawing, the portion of the machine supporting the jaws and hereinafter termed the "frame" is indicated at 1, and this frame has a longitudinal groove of rectangular cross section indicated at 2 in which the two jaw plates 3 and 4 are secured as by the cap screws 5 and 6. The jaw plates 3 and 4 are spaced apart and securely held in the spaced position by the cap screws. At the forward or right hand end of the jaws, as will be understood from Figs. 1 and 2, the plates are recessed to receive the guide plates 7 and 8 which are supported by the series of screws 9 in the opposite walls of the nut passageway 10 of the chute 11.

The chute is shown in cross section in Fig. 3 wherein it is noted that a nut recess 8a is formed therein which is covered by a plate 12 secured thereon by screws 13. The base of the chute is secured to the member 1 of the machine as by cap screws 14 and this base of the chute is recessed to engage over the right hand end of the jaw plates and the jaw plates at the upper edge are therefore held at the chute end between the lower ends of the inserts or guide plates 7 and 8 and adjacent shoulder formed in the bottom of the chute. The guide plates 7 and 8 are preferably formed of wear resistant material and extend approximately to and terminate approximately on the axial line of the nut and tap. Due to the angular disposition of the portion 1 in respect to the horizontal in the form shown in Fig. 1, the chute is curved so that the upper end of the chute is in substantially a vertical plane and, with a stack of nuts therein, the nuts are forced by gravity between the plates 7 and 8 and at the forward end of the upper pair of inserted wear resistant bars 15.

The bars are four in number indicated in Fig. 2 and the jaws are longitudinally grooved as indicated at 16 to form a space between the jaws of greater width than the nut. The angular faces of the groove in the construction shown are recessed or grooved to receive the wear strips or bars. The bars are made of a hard metal such as a tungsten alloy and are supported in position in their respective recesses by means of the screws 17, there being a number of such screws for each strip as will be understood from Fig. 2 in which two screws are shown for each strip.

The upper pair of wear strips terminate in a line practically flush with the inner face of the plate 12 of the chute and the lower pair of wear plates extend to beyond the chute. Thus the lowest nut of the stack of nuts carried in the chute may pass to between the jaws and between the members 7 and 8 of the chute with the two lower angularly disposed side faces of the nut resting upon the lowermost pair of wear strips or bars. The machine includes a reciprocable plunger 18 which is positioned on the extended axis of the tap. When the plunger is moved backward from the position shown in Fig. 1, the lowermost nut of the group falls to the position as shown in Fig. 2. The plunger in thereafter moving forward forces the nut along and between the wear strips whereby it is held from rotation as it is moved onto the rotatable tap indicated at 19. The nut is moved onto the tap by the plunger and then the nut is moved longitudinally of the tap due to its threaded engagement therewith and passes from between the jaws onto the shank 20 of the tap 19.

With this arrangement of the parts, it will be noted that the nut while not a tight fit in the chute or between the members 7 and 8, nevertheless is guided in its movement and maintained in its position at the bottom of the chute in a plane at a right angle to the axis of the tap and of the plunger due to its seating upon the lower pair of wear strips before it passes entirely from the bottom end of the chute. It is thus positioned so that movement of the plunger moves the nut in its proper plane along the wear plates to the tap. The position of the lowermost nut in respect to the wear strips 15 is shown in Fig. 4 and the liability of the nut becoming accidentally displaced from its proper plane in respect to the axis of the tap and plunger is reduced to a minimum.

The nut holding jaws of the machine are constructed to utilize a single size nut and thus each of the machines of a series is adapted only for nuts of one size. By use of the inserted bars or strips of wear resistant metal providing the bearing surfaces for the nuts and with the bars of a width of face less than the side face of the nut contacting therewith, there is less frictional resistance to movement of the nut by the plunger in forcing the same onto the tap and a much longer life of the particular jaw is secured by use of such wear resistant bearing members for the nut. As the wear resistant jaws are mounted in grooves formed in the opposing faces of the two jaws they are securely held from displacement and can, if desired, be adjusted for wear by introducing a shim 21 in the bottom of the groove for the wear resistant bar 15.

However, as the bars of one machine become worn sufficiently they may replace the worn bars of the machine for the next larger size of nut and thus through a series of machines, the bars may be continually used as they become worn sufficiently to replace the worn bars of a machine for the next larger size nut.

The bars are formed of wear resistant metal such as some of the tungsten alloys as previously stated and are expensive in comparison to the usual hardened steel jaws, and due to the fact that the bars may be utilized in several different machines as wear does take place, a saving in cost is accomplished and also a saving is accomplished due to the fact that instead of making the jaws themselves of a wear resistant material, I provide the nut supporting face of the jaw by small inserts of the wear resistant material.

By the structure described therefore, a material saving over present forms of construction utilizing hardened steel jaws is accomplished, a much longer life of the machine is assured, and by the arrangement of parts as described and the extending of the chute into the nut recess to support the nut in its place with the axis of its aperture coinciding with the extended axis of the tap and resting on the wear resistant bars, I provide a mechanism wherein the various objects and features of the invention are attained.

Having thus fully described my invention, its utility and mode of operation, what I claim and desire to secure by Letters Patent of the United States is—

1. In a nut tapping machine, a pair of spaced parallel nut holding jaws secured in fixed position, the said jaws each having a recess near one end, a chute secured in fixed relation with the jaws and having oppositely disposed nut guide portions extending into the respective opposed recesses of the jaws, a pair of upper guide bars extending longitudinally and in opposed position on the respective jaws and terminating approximately at the recess for the guide portions of the chute, and a pair of lower oppositely disposed guide bars each positioned in the opposed faces of the respective jaws and extending beneath the said guide portion of the chute in position to receive nuts feeding to between the jaws from the chute, said pairs of bars being of a wear resistant material and each engaging a side face of a nut to thereby hold the same from rotation.

2. In a nut tapping machine, a pair of spaced parallel nut holding jaws, said jaws each having a recess near one end, the said recesses being in opposed relation transversely of the jaws, a chute secured in fixed relation with the jaws and having oppositely disposed nut guide portions extending into the respective opposed recesses of the jaws, a pair of upper guide bars extending longitudinally and in opposed relation on the respective jaws and terminating approximately at the recess for the guide portions of the chute, and a pair of lower oppositely disposed guide bars positioned in the opposed faces of the respective jaws and respectively extending beneath the said guide portions of the chute and positioned to receive nuts as they feed to between the jaws from the chute, the said guide portions of the chute extending to position in a plane cutting the axis of a deposited nut to thereby maintain the same in position for feeding along the bars, said bars each being of a wear resistant material and each engaging a side face of the nut to thereby hold the same from rotation in a threading operation.

3. In a nut tapping machine, a pair of spaced parallel nut holding jaws, said jaws each having an upper and a lower longitudinal groove, a bar for each of the grooves of both said jaws and positioned therein to provide faces for engagement with the respective side faces of a nut, means for varying the position of the bars toward or from a longitudinal center line therebetween to thereby compensate for wear, the lower bars being of greater length than the upper bars, a chute secured in fixed relation with the jaws and having nut guiding portions extending to between the jaws to a plane cutting the said longitudinal center line, the nuts in feeding through the chute positioning a nut on the lower bars with the axis thereof on the said longitudinal center line between the nut supporting bars.

4. In a nut tapping machine, a pair of nut holding jaws arranged in stationary spaced relation, wear strips removably mounted on the jaws and having angularly disposed flat faces for engagement with the respective angularly disposed side faces of a nut along which a nut may be moved with the axis of the nut substantially on a longitudinal center line between the said strips, a chute for delivering nuts to between the jaws to rest upon the lowermost strips of the two pairs and in position to be moved from beneath the chute for engagement with the other upper pair of wear strips, said strips holding the nut from rotation during movement along the wear strips, and means for adjusting the wear strips relative to the longitudinal center line therebetween to compensate for wear.

HENRY P. SELMAN.